April 24, 1928.  1,667,285

A. B. CLISSON

WORM OILING MEANS

Filed Nov. 22, 1923   2 Sheets-Sheet 1

Albert B. Clisson INVENTOR.

BY Parsons & Bodell ATTORNEYS.

Patented Apr. 24, 1928.

1,667,285

UNITED STATES PATENT OFFICE.

ALBERT B. CLISSON, OF GEDDES, NEW YORK, ASSIGNOR, BY MESNE ASSIGNMENTS, TO THE PROSPERITY COMPANY, INC., OF SYRACUSE, NEW YORK, A CORPORATION OF NEW YORK.

WORM-OILING MEANS.

Application filed November 22, 1923. Serial No. 676,442.

As is well known to those skilled in the art, the lubricating of worm gear devices used in various types of machines, such as worm gear drive transmitting motion from electric motors and the worm gear drive of motor vehicles, etc., is difficult as the worm becomes heated after continued operation unless perhaps the oil level is sufficiently high to flood the bearings and the worm. This invention has for its object a particularly simple and efficient means to adequately lubricate the bearings of worm gear drives, without maintaining a high oil level in the casing. The invention consists in the novel features and in the combinations and constructions hereinafter set forth and claimed.

In describing this invention reference is had to the accompanying drawings in which like characters designate corresponding parts in all the views.

Figure 1:
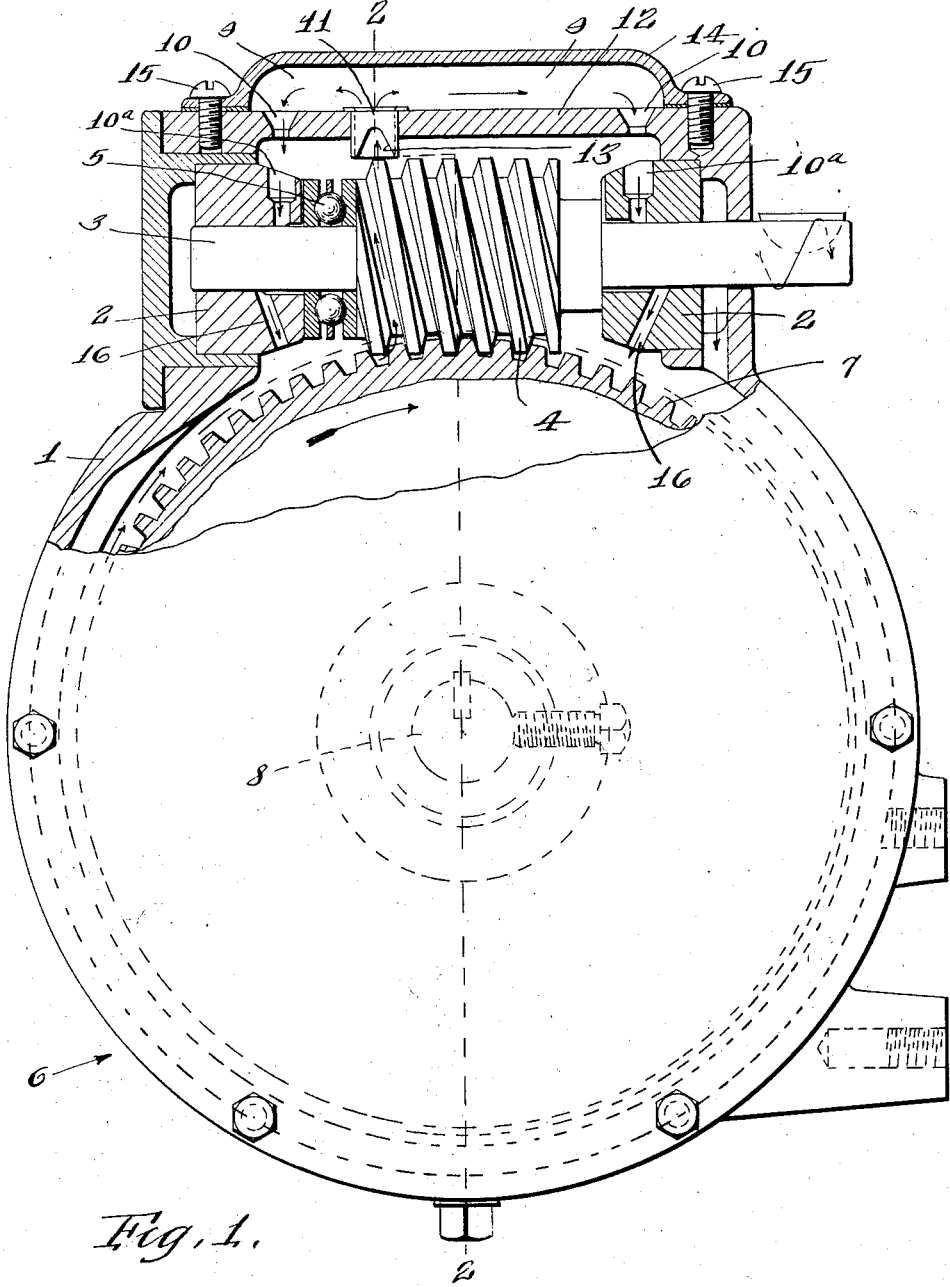
Figure 2:
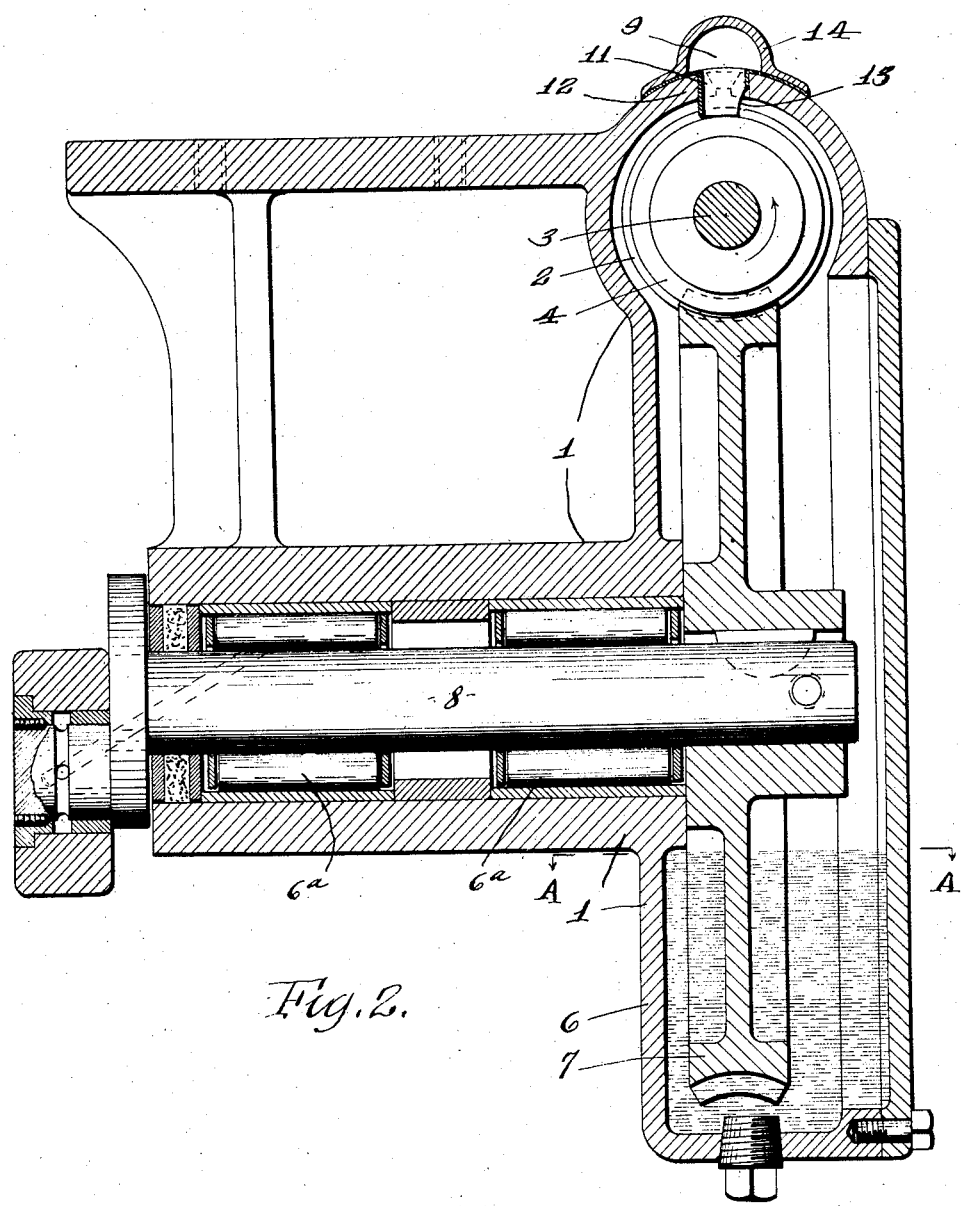

Figure 1 is a sectional view, partly in elevation, of one embodiment of my invention, Figure 2 is a sectional view, taken on line 2—2, Fig. 1.

This lubricating means for the bearings of worms, comprising a casing having bearings therein, a shaft journalled in the bearings, a worm mounted on the shaft and rotatable therewith, a worm gear meshing with the worm and having portions thereof running or dipping in an oil bath, and means for transferring the oil from the worm to the bearings, said means being so arranged relatively to the worm that the worm acts as a pump to force the oil through said means to the bearings.

I have here illustrated my invention as embodied in a gearing, particularly applicable for transmitting the motion of a motor, as an electric motor, connected directly to the drive shaft of the reduction gearing of the motion transmitting mechanism, such gearing being used generally in numerous situations in which a machine is driven by an electric motor. However, it will be understood that it may be embodied in any other situation, such as worm gear drives of motor vehicles.

1 designates the casing formed with suitable bearings 2, 3 is a shaft, which is journalled in the bearings, the shaft being connected to any suitable actuator or prime mover, as an electric motor, not shown, or to any other drive shaft.

4 is the worm, mounted on the shaft 3, to rotate therein, it being here shown as also thrusting against a suitable thrust bearing 5.

The portion of the casing in which the worm and shaft are located is tubular in general outline, and the case in addition includes a portion 6 enclosing a worm wheel 7, which meshes with the worm 4 the portion 6 having bearings 6$^a$ for the shaft 8, on which the worm wheel 7 is mounted. This portion 6 of the casing forms a container for oil, and the level of the oil is preferably low, as indicated by the line A—A, in order that the oil will not work or flow out along the shaft 8.

The means for transferring the oil from the worm 4 to the bearings 2 for the shaft 3, comprises passages 9, having an inlet located in proximity to the periphery of the worm, and outlet ducts 10 leading to the bearings for the shaft 3. The inlet is here shown as extending at an angle through the wall of the case 1, separating the interior of the case from the passages 9, the inlet being arranged preferably near the rear end of the worm with respect to the direction of rotation and in position to deflect the oil given or thrown by the worm into the passages 9. This inlet is here shown as a tubular deflector 11, extending through the wall 12, between the interior of the case 1 and the passages 9, the tubular deflector having its advance side, with respect to the direction of the rotation of the worm, formed with a cutout 13.

As here illustrated the passages 9 lead in opposite directions from the inlet and are formed by an elongated removable cap 14, mounted on the case and held in position in any suitable manner, as by screws 15. Outlet passages 16, are also provided from bearings to the interior of the case 6. The outlet passages 10, as here illustrated comprise sections leading from the passages 9 into the interior of the case 1 and sections 10$^a$ leading from the interior of the case to the bearings 2, the sections of the passages 10 being in alinement.

In operation the oil is filled in the lower portion of the case 6 and during the turning of the worm wheel 7 by the worm 4 the oil is carried by the worm wheel 7 to the worm 4 and during the rotation of the worm the oil advances towards the rear end of the worm and is thrown centrifugally and conducted by the deflector 11 and into the cap 14, and through the passages 9 of the cap and the ducts 10 to the bearings for the shaft 3. The worm thus acts as a pump to force the oil to the bearings.

By my invention an oil level can be maintained sufficiently low to prevent the leakage of oil out along the shaft 8 or other points, and furthermore, the bearings for the worm shaft 3 receives at all times adequate forced lubrication.

What I claim is:

1. In a lubricating means for the bearings of worms, the combination of a casing having bearings therein, a shaft journalled in the bearings and having a worm thereon, a worm gear mounted in the casing and meshing with the worm, a portion of the casing enclosed with the worm gear, constituting an oil reservoir, an oil receiver arranged in proximity to the worm, and having an inlet arranged near the worm for receiving oil thrown by the worm, and outlet passages leading from the receiver to the bearings.

2. In a lubricating means for the bearings of worms, the combination of a casing having bearings therein, a shaft journalled in the bearings, a worm mounted on the shaft, a worm gear meshing with the worm, a portion of the casing forming an oil bath in which the worm wheel runs, and a receiver located out of the oil bath having an inlet arranged in proximity to the worm to receive oil therefrom, and outlets discharging into said bearings, the inlet comprising a deflector arranged at an angle to the periphery of the worm.

3. In a lubricating means for the bearings of worms, the combination of a casing having bearings therein, a shaft journalled in the bearings, a worm mounted on the shaft, a worm gear meshing with the worm, a portion of the casing forming an oil bath in which the worm wheel runs, and a receiver located out of the oil bath having an inlet arranged in proximity to the worm to receive oil therefrom, an outlet discharging into said bearings, the inlet comprising a deflector arranged at an angle to the periphery of the worm, and near the rear end of the worm, with respect to the direction of rotation of the worm.

4. In a lubricating means for the bearings of worms, the combination of a casing, a shaft journalled in the bearings, a worm mounted on the shaft in the casing, a cap mounted on the casing, ducts connecting the interior of the cap and the bearings, and an inlet in the wall of the casing underlying the cap, the inlet being located in proximity to the worm to receive the oil therefrom, whereby the oil is forced by the worm into the inlet of the cap and through the ducts to the bearings.

5. In a lubricating means for the bearings of worms, the combination of a casing, a shaft journalled in the bearings, a worm mounted on the shaft in the casing, a cap mounted on the casing, ducts connecting the interior of the cap and the bearings, and an inlet in the wall of the casing underlying the cap, the inlet being located in proximity to the worm to receive the oil therefrom, said inlet comprising a tubular deflector extending through the wall of the casing underlying the cap, whereby the inlet establishes communication between the cap and the interior of the casing, said deflector having a cutout in the front side with respect to the direction of rotation of the worm, and being located near the rear end of the worm.

6. In a lubricating means for the bearings of worms the combination of a casing, having bearings therein, a shaft journaled in the bearings, a worm on the shaft, a worm wheel meshing with the worm, a portion of the casing forming an oil bath in which the worm runs and means above the worm and out of the oil bath for transferring the oil thrown by the worm to the bearings.

In testimony whereof, I have hereunto signed my name, at Syracuse, in the county of Onondaga, and State of New York, this 15th day of Nov. 1923.

ALBERT B. CLISSON.